(12) United States Patent
Yamada

(10) Patent No.: US 8,471,540 B2
(45) Date of Patent: Jun. 25, 2013

(54) DC-DC CONVERTER

(75) Inventor: Kouhei Yamada, Tokyo (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 0 days.

(21) Appl. No.: 11/878,433

(22) Filed: Jul. 24, 2007

(65) Prior Publication Data
US 2008/0024104 A1 Jan. 31, 2008

(30) Foreign Application Priority Data

Jul. 25, 2006 (JP) ................................. 2006-201472

(51) Int. Cl.
G05F 1/00 (2006.01)
(52) U.S. Cl.
USPC ........................................... 323/282; 323/222
(58) Field of Classification Search
USPC ............................ 323/282, 222, 283, 284, 271
See application file for complete search history.

(56) References Cited

U.S. PATENT DOCUMENTS

| 5,742,494 A | 4/1998 | Brakus et al. | |
| 7,019,501 B2 * | 3/2006 | Dogome et al. | 323/282 |
| 7,071,665 B2 * | 7/2006 | Tzeng et al. | 323/282 |
| 2003/0184270 A1 * | 10/2003 | Kirn | 323/282 |
| 2004/0135564 A1 * | 7/2004 | Huang et al. | 323/282 |
| 2005/0057238 A1 * | 3/2005 | Yoshida | 323/282 |
| 2005/0237037 A1 * | 10/2005 | Xing | 323/268 |
| 2005/0264268 A1 * | 12/2005 | Ueno | 323/211 |
| 2006/0164057 A1 * | 7/2006 | Kudo et al. | 323/282 |
| 2007/0040537 A1 * | 2/2007 | Low et al. | 323/282 |
| 2007/0069703 A1 * | 3/2007 | Kokubun et al. | 323/282 |
| 2007/0145961 A1 * | 6/2007 | Hasegawa et al. | 323/282 |

FOREIGN PATENT DOCUMENTS

| JP | 10-56258 A | 6/1998 |
| JP | 2003-164141 A | 6/2003 |
| JP | 2004-096982 | 3/2004 |
| JP | 2006-074973 | 3/2006 |

* cited by examiner

Primary Examiner — Nguyen Tran
(74) Attorney, Agent, or Firm — Rabin & Berdo, P.C.

(57) ABSTRACT

A DC-DC converter performing pulse frequency modulation (PFM) control with a fixed ON time, having a control circuit performing PFM control of the ON time for a switch, including an error amplifier amplifying the difference between an output voltage and a target voltage, a voltage controlled oscillator increasing and decreasing in frequency and outputting an error signal, and a one-shot circuit generating the ON time based on a trigger signal output from the VCO, where ON time is linked to an input voltage and/or an output voltage. The switching frequency decreases under light loads and current consumption is reduced, and the switching frequency is made to be approximately constant under heavy loads.

6 Claims, 8 Drawing Sheets

| D1 | D2 | DIVISION RATIO | CAPACITANCE RATIO |
|---|---|---|---|
| 0 | 0 | 2/3 | 3 |
| 0 | 1 | 1/2 | 4 |
| 1 | 0 | 2/5 | 5 |
| 1 | 1 | 1/3 | 6 |

DC-DC CONVERTER

BACKGROUND OF THE INVENTION

1. Field of the Invention

The present invention relates to a DC-DC converter performing DC-DC (direct current-direct current) conversion by switching a switching element ON and OFF, and in particular to a DC-DC converter employing Pulse Frequency Modulation (hereinafter referred as PFM) control of a fixed ON time of the switching element.

2. Related Art

In recent years, in DC-DC converters used as a power supplies of portable devices and the like, reducing current consumption in a standby mode has been requested. PFM control of a fixed ON time is a control technique which adjusts an output voltage of the DC-DC converter by fixing an ON time of the switching element of the DC-DC converter and varying an OFF time of the switching element, and when there is little load current, the DC-DC converter operates in a discontinuous current mode and a switching frequency decreases in approximate proportion to decreasing of a load current. Therefore, switching loss can automatically be reduced under light loads such as in standby mode.

When the load current is somewhat larger, the DC-DC converter with PFM control operates in a continuous current mode, and operates at an approximately constant switching frequency determined depending on a ratio between the input voltage and the output voltage. Thus, when the DC-DC converter is used under the condition of the constant input voltage, the switching frequency under a heavy load can be adjusted in a desired range by selecting the ON time to be a suitable value.

However, in the case where the input voltage varies due to the drain of a battery or use of a plurality of power supplies, or in the case of use after the output voltage is set arbitrarily, because the switching frequency is varied by an operating condition, power conversion efficiency is reduced. As a countermeasure, it has been proposed, for example, in Japanese Laid-Open Patent No. 2004-96982 that PFM control is performed under light loads, and it is changed under heavy loads to Pulse Width Modulation (hereinafter referred as PWM) control which the switching frequency is fixed and the ON time and the OFF time are variable.

However, in the conventional DC-DC converter as described above, in the case where the switching control mode is changed between light-load times and heavy-load times, high performance can be maintained in a wide load region, but because current detection to change the control circuit is necessary and it is necessary to provide control circuits for two systems, problems arise in that the circuit configuration becomes complicated, and current consumption in the control circuits increases.

It is therefore an object of the present invention to provide a DC-DC converter in which reduction of current consumption can be obtained with a simple configuration and the switching frequency decreases in the light load case without being concerned with a change of the input voltage and the output voltage, and further, it is possible to operate at an approximately constant switching frequency in the heavy load case.

SUMMARY OF THE INVENTION

To accomplish the above object, the present invention provides a DC-DC converter that solves the above-explained problems. According to a first aspect of the invention, the DC-DC converter controlling direct current power based on switching an input direct current on and off by means of a switching element is characterized by including a control circuit performing PFM control where an OFF time of the switching element is varied according to the PFM control so as to vary a duty ratio, and where the control circuit also varies an ON time according to at least one of an input voltage change and an output voltage change.

In such a DC-DC converter, because the ON time of the switching element is linked to at least one of the input voltage change and the output voltage change by the control circuit performing PFM control, reduction of current consumption can be obtained by means of a simple configuration and the switching frequency decreases in the light load case regardless of a change of the input voltage and the output voltage, and further, it is possible to operate at an approximately constant switching frequency in the heavy load case.

It is advantageous that in the DC-DC converter according to the first aspect of the present invention, because the ON time of the switching element is linked to at least one of the input voltage change and the output voltage change by the control circuit performing PFM control, reduction of current consumption can be obtained by means of a simple configuration and a switching frequency decreases in the light load case regardless of a change of the input voltage and the output voltage, and further it is possible to operate at an approximately constant switching frequency in the heavy load case.

DETAILED DESCRIPTION OF THE PREFERRED EMBODIMENT

Figure 1:
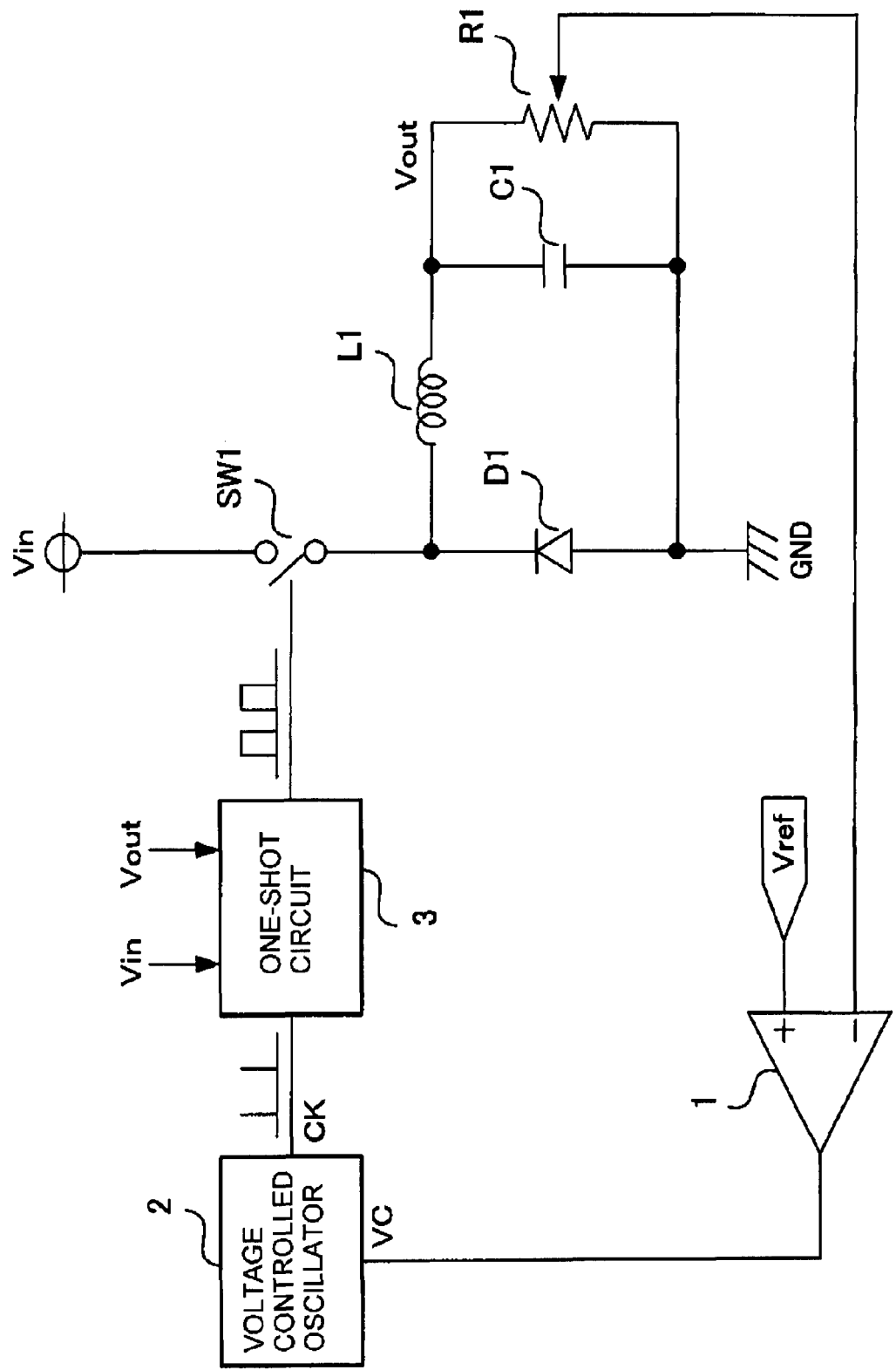
FIG. 1 shows the basic configuration of a DC-DC converter according to a preferred embodiment of the present invention.
Figure 8:
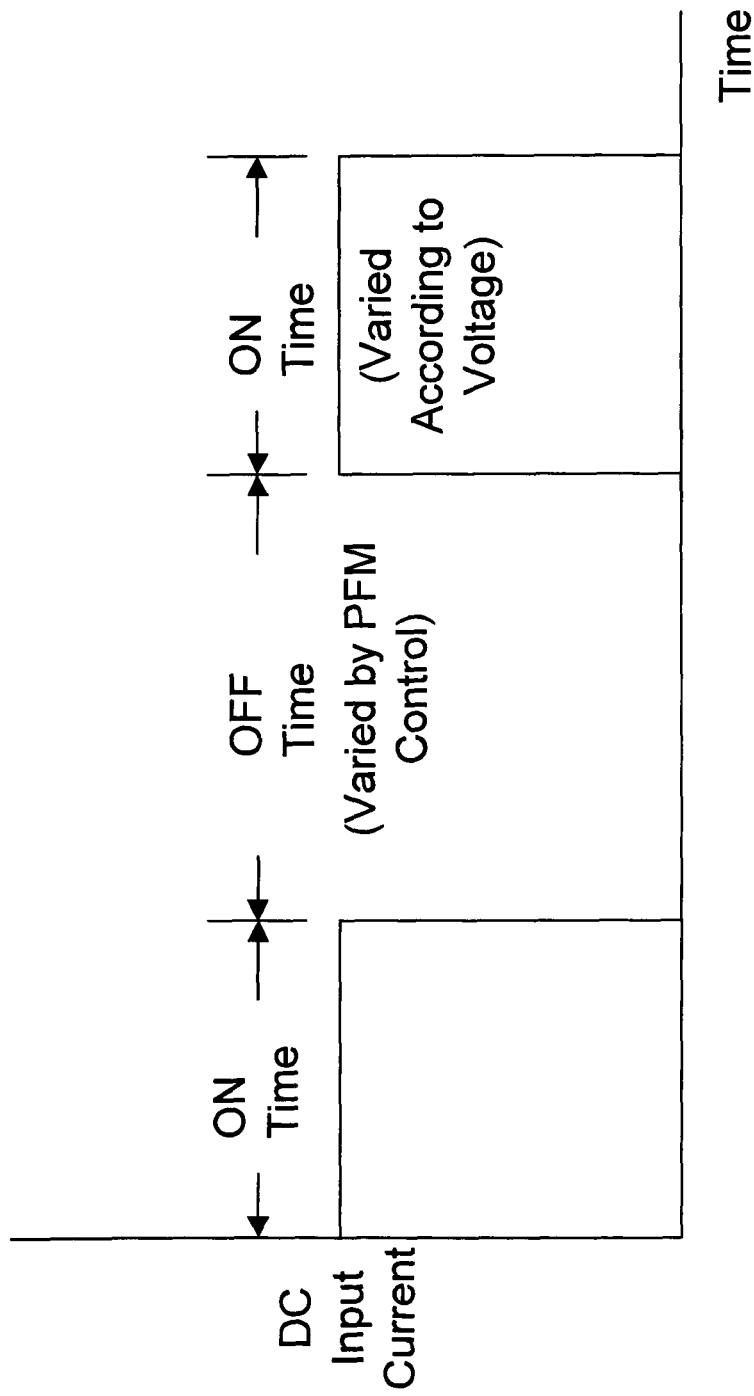
FIG. 8 is a waveform diagram according to the preferred embodiment.

A preferred embodiment of a DC-DC converter according to the invention is explained in detail with reference to the attached drawings. FIG. 1 is a view showing the basic configuration of a DC-DC converter according to a preferred embodiment of the present invention, and FIG. 8 is a corresponding waveform diagram. The DC-DC converter is a step-down converter that controls direct current power based on switching an input direct current on and off by means of an electric switch SW1, and includes a control circuit performing PFM control in which an OFF time of the electric switch SW1 is varied. An ON time of the electric switch SW1 is varied according to at least one of the input voltage change and the output voltage change by the same control circuit employed to perform PFM control. Concretely, the ON time of the electric switch SW1 decreases with rise of the input voltage Vin or increases with rise of the output voltage Vout.

The control circuit includes an error amplifier 1 including an operational amplifier amplifying the difference (an error) between the output voltage Vout and a target voltage, a voltage controlled oscillator 2 increasing and decreasing in a switching frequency with an error signal being output from the error amplifier 1, and a one-shot circuit 3 which generates a predetermined ON time due to be triggered by a frequency signal being output from the voltage controlled oscillator 2.

In addition, a diode D1 is connected in series with the electric switch SW1. Pulsating flow generated by ON and OFF switching of the electric switch SW1 is rectified and smoothed by an inductor L1 and a capacitor C1, and electric power is supplied to a load (not illustrated). The output voltage Vout is detected as a divided voltage (a detection signal) by a resistor R1, and the detection signal is input into an inverting input terminal (−) of the error amplifier 1. The detection signal is compared with a reference voltage Vref of a target value being input into a non-inverting input terminal (+) of the error amplifier 1. The frequency of the voltage controlled oscillator 2 is decreased when the output voltage Vout is higher than the target voltage which is set, and the frequency of the voltage controlled oscillator 2 is increased when the output voltage Vout is lower than the target voltage. Thereby, the output voltage Vout is controlled to become equal with the target voltage. In addition, since the output voltage Vout becomes high in a light load case and the output voltage Vout becomes low in a heavy load case, the frequency is controlled to decrease in the light load case and to increase in the heavy load case.

Information relating to the input voltage Vin and the output voltage Vout is input to the one-shot circuit 3 as feedback signals, and the value of the ON time of the electric switch SW1 is adjusted corresponding to the information. Since the duty ratio in a continuous current mode is to be determined as almost "the output voltage Vout/the input voltage Vin" in a step-down converter, it is desirable that value of the ON time should approach a characteristic to be proportional to the output voltage Vout and to be inverse proportional to the input voltage Vin.

Figure 2:
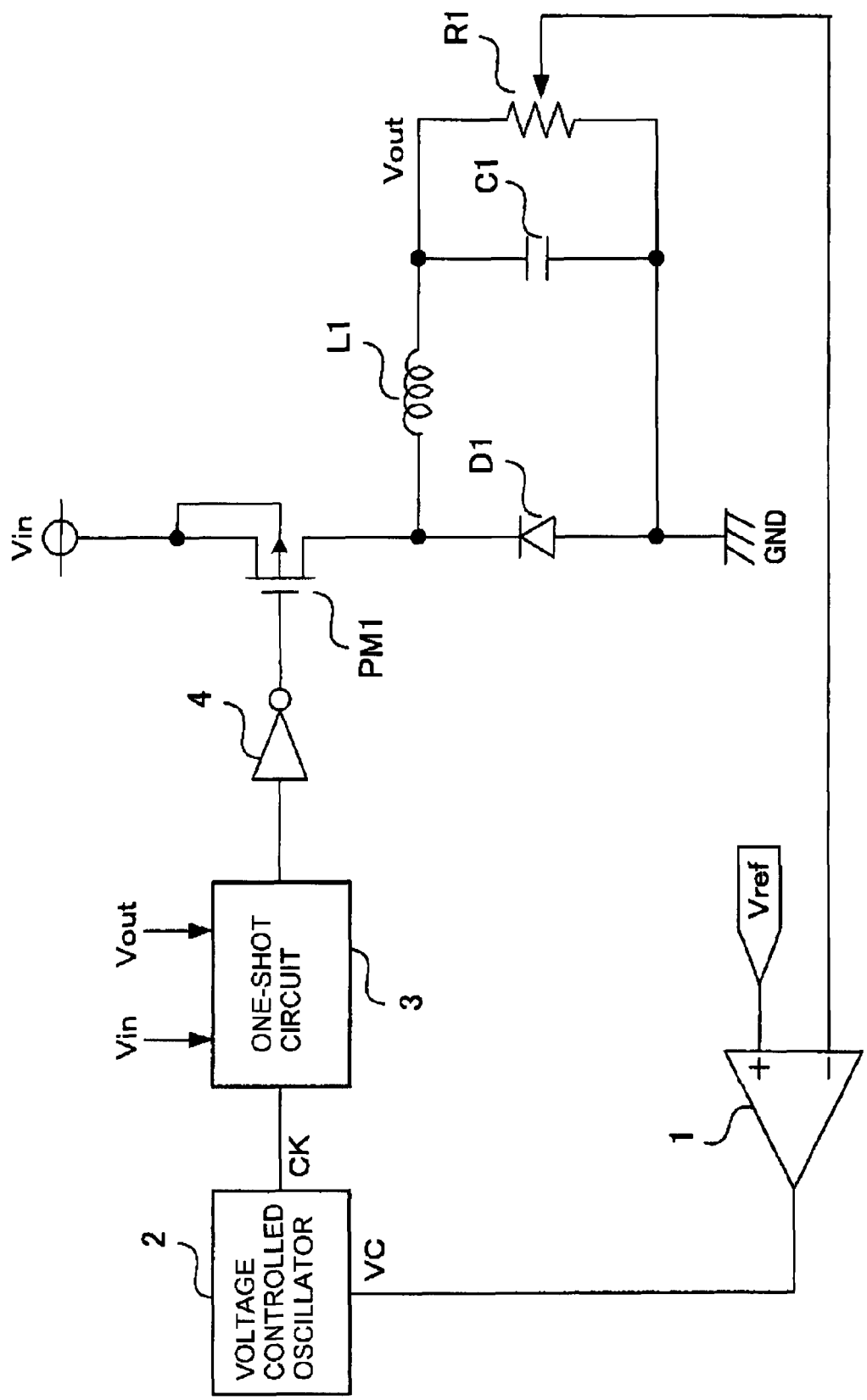
FIG. 2 shows the circuit configuration of the DC-DC converter according to the preferred embodiment of the present invention.

FIG. 2 is a view showing a circuit configuration of a DC-DC converter according to the embodiment of the present invention, and the same symbols as FIG. 1 are respectively used as the same elements as FIG. 1. In this embodiment, a MOS transistor PM 1 of a P channel is used as a switching element switching on and off a direct current from the input voltage Vin, and a driver 4 (an inverter) is interposed between a gate of the MOS transistor PM 1 and a one-shot circuit 3.

Figure 3:
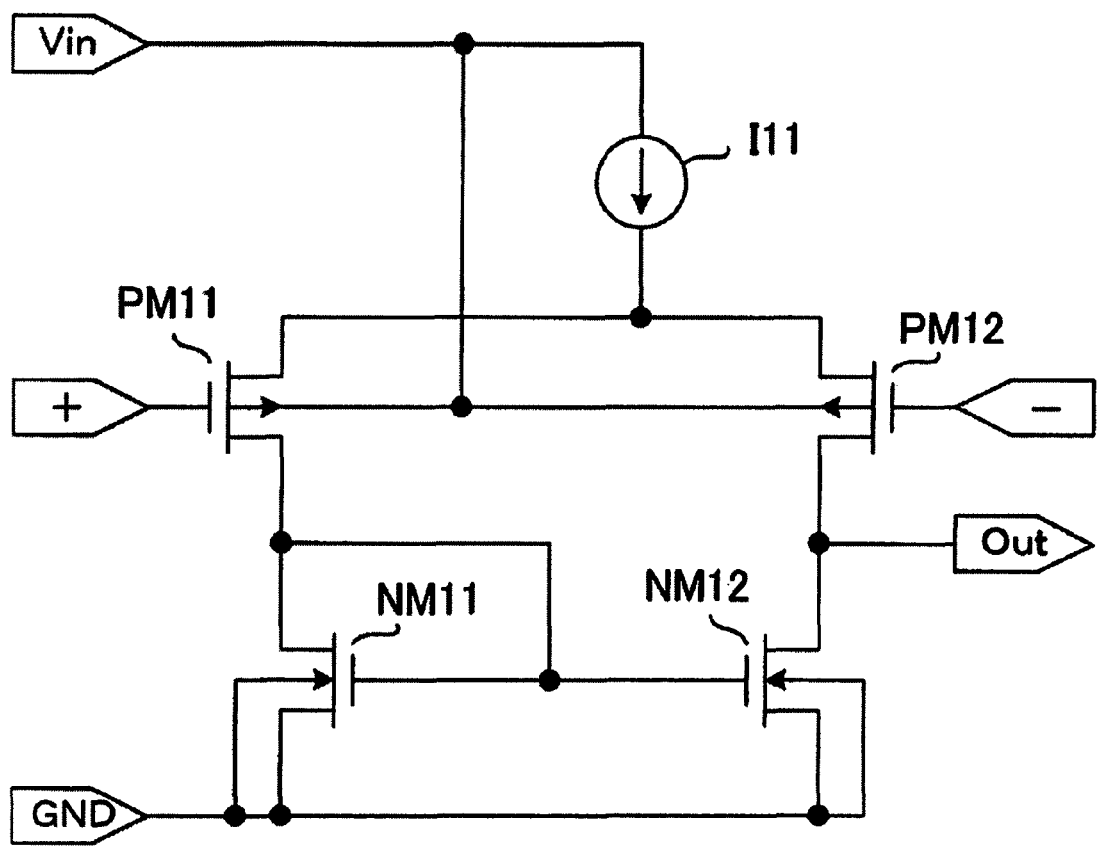
FIG. 3 is a circuit diagram showing the detail of an error amplifier according to the preferred embodiment.

FIG. 3 is a circuit diagram showing the detail of the error amplifier 1 according to the preferred embodiment. The error amplifier 1 includes a current source I11, MOS transistors PM11 and PM 12 of the P channel and MOS transistors NM11 and NM12 of an N channel, and is configured in one step of a differential amplification circuit. An output signal (Out) which is an error signal is input into the voltage controlled oscillator 2 as a voltage control signal (VC). In addition, the control loop can be given stability by connecting a suitable phase compensation element between an inverting input terminal and an output terminal.

Figure 4:
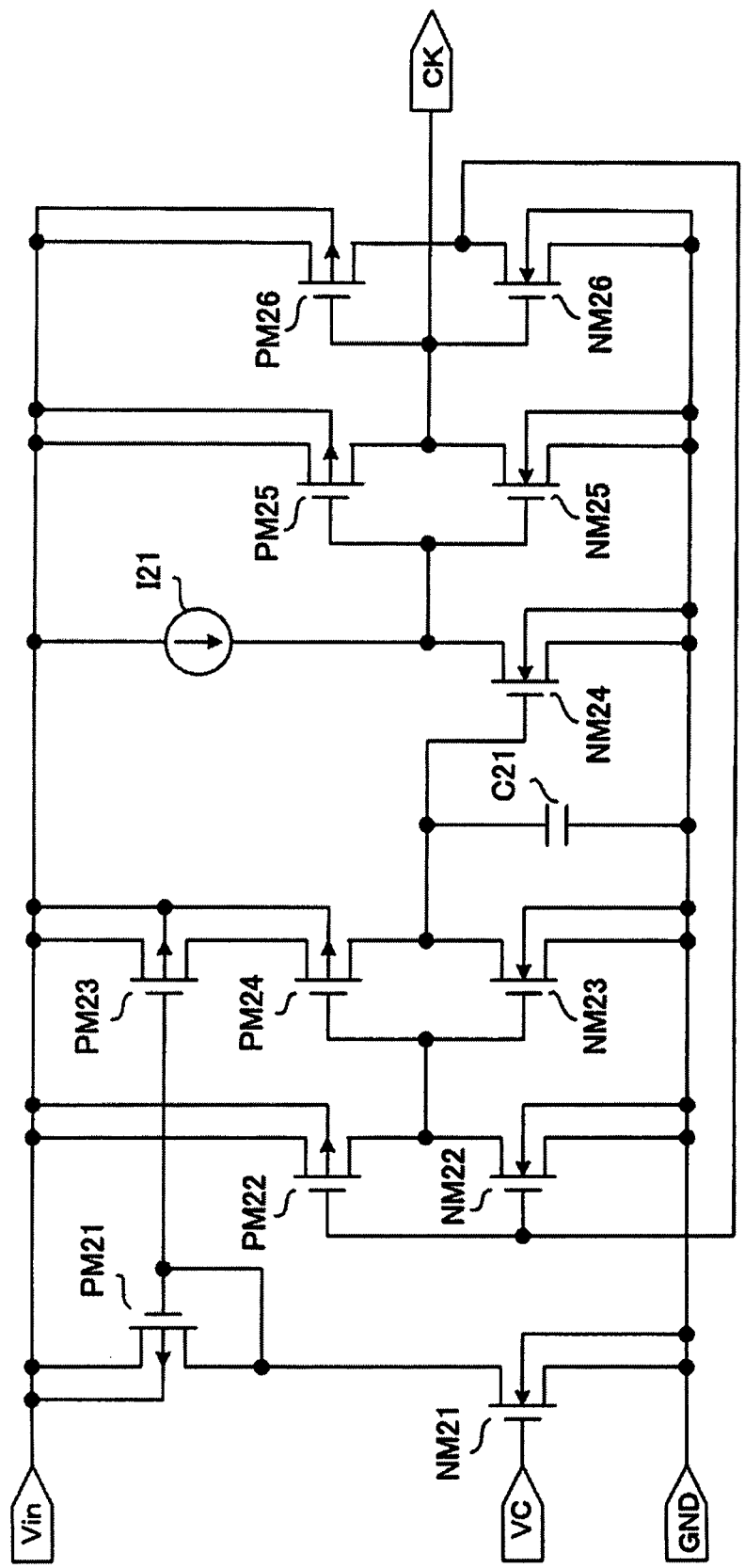
FIG. 4 is a circuit diagram showing an example of the configuration of a voltage controlled oscillator according to the preferred embodiment.

FIG. 4 is a circuit diagram showing an example of the configuration of the voltage controlled oscillator 2 according to the above embodiment. The voltage controlled oscillator 2 includes a current source 121, a capacitor C21, MOS transistors PM21 through PM 26 of the P channel and MOS transistors NM21 through NM26 of the N channel, and is configured as a ring oscillator including a delay circuit.

The MOS transistor PM 21 and the MOS transistor PM 23 constitute a current mirror circuit. When the voltage of the voltage control signal (VC) from the error amplifier 1 rises, current flowing in the MOS transistor NM21 increases and current flowing to the MOS transistor PM 21 and the MOS transistor PM 23 also increases. Thus, current charging the capacitor C21 increases and the oscillation frequency increases. On the other hand, when the voltage of the voltage control signal (VC) drops, current flowing in the MOS transistor NM21 decreases and current flowing to the MOS transistor PM 21 and the MOS transistor PM 23 decreases. Thus, current charging the capacitor C21 decreases and the oscillation frequency decreases.

As described above, the capacitor C21 is charged with current controlled by the voltage control signal (VC), and when a charging voltage (voltage between the terminals) of the capacitor C21 becomes higher than a threshold voltage of an inverter configured in the current source 121 and the MOS transistor NM24, an oscillation signal (CK) becomes H (High) level and a gate voltage of the MOS transistor NM23 also becomes H level. Therefore, the capacitor C21 is discharged through the MOS transistor NM23 for an instant. The waveform of the oscillation signal (CK) being output from the voltage controlled oscillator 2 becomes a pulse in the shape of a mustache which becomes H level during a very short time as shown in FIG. 1. Current consumption of the voltage controlled oscillator 2 reduces as the oscillation frequency decreases.

Figure 5:
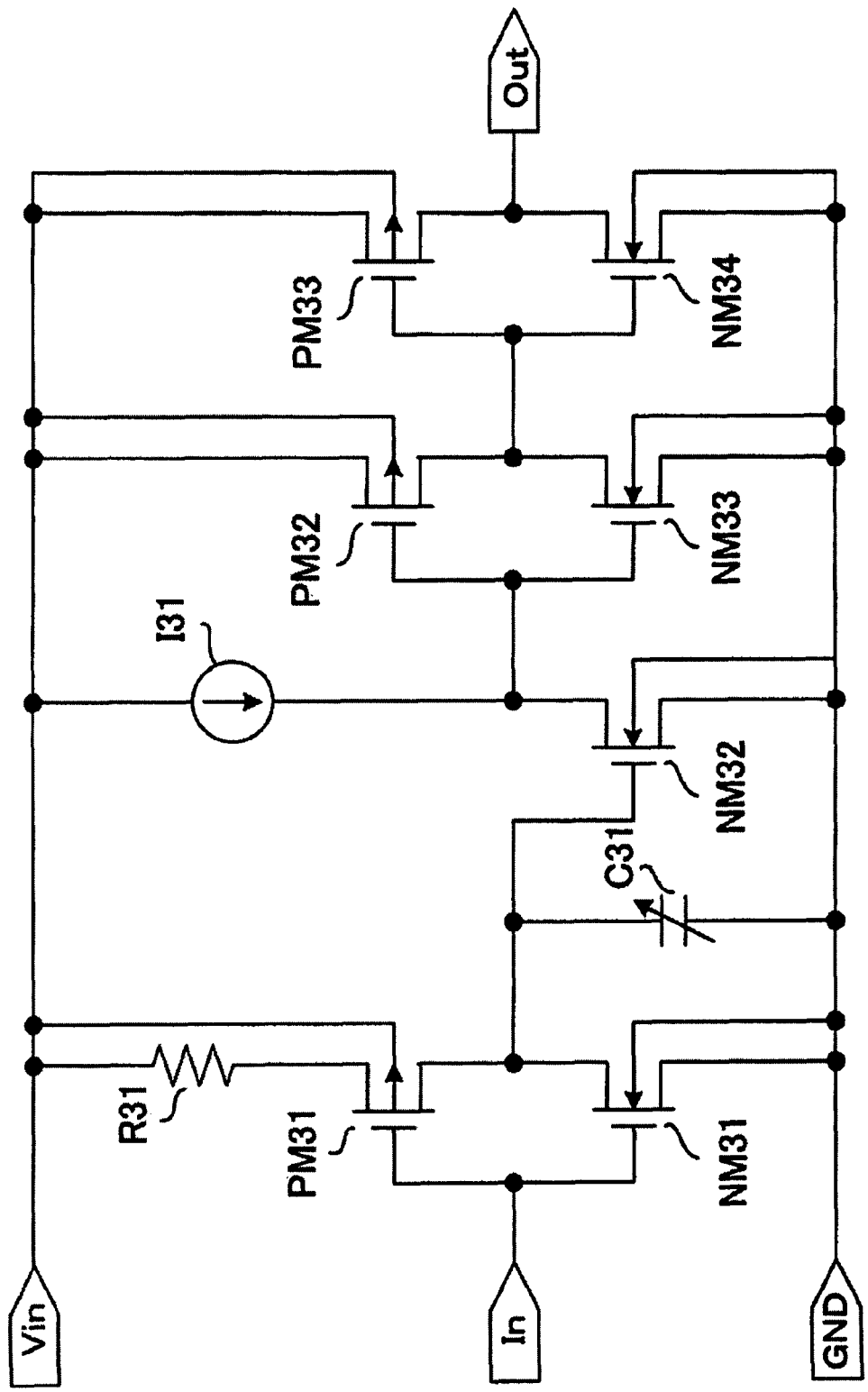
FIG. 5 is a circuit diagram showing an example of the configuration of a one-shot circuit according to the preferred embodiment.

The oscillation signal (CK) of the voltage controlled oscillator 2 becomes an input signal (In) of the one-shot circuit 3. FIG. 5 is a circuit diagram showing an example of a configuration of the one-shot circuit 3 according to this embodiment. The one-shot circuits 3 includes a resistor R31, a current source 131, a capacitor C31 of a variable capacitance, MOS transistors PM 31 through PM 33 of the P channel and MOS transistors NM 31 through NM 34 of the N channel, and the capacitor C31 is a capacitor of the variable capacitance having a capacitance value corresponding to the output voltage Vout or a target voltage. An output signal (Out) of the one-shot circuits 3 is input into the driver 4.

In the one-shot circuit 3, a current-supply circuit to supply a charging current to the capacitor C31 is constituted by the MOS transistor PM 31, and a charging current is supplied that depends on the input voltage Vin. In addition, a voltage decision circuit to determine whether the voltage of the capacitor C31 is more than a predetermined voltage is constituted by the current source 131 and the MOS transistor NM32.

When the input signal (In) becomes H level, the capacitor C31 is discharged through the MOS transistor NM31 and an output Isignal (Out) becomes H level quickly. Then, subsequently, the very short time (H level duration To) passes, and when the input signal (In) becomes L (Low) level, the capacitor C31 is charged slowly by charging current which flows through the MOS transistor PM 31 from the resistor R31. When the voltage of the capacitor C31 reaches a threshold value Vth1 of the inverter configured in the current source 131 and the MOS transistor NM32, the output signal (Out) comes back to L level.

In this bout, if the threshold value Vth1 of the inverter is set in the vicinity of a region where the MOSFET used has a zero temperature coefficient, the temperature dependency of the variable ON time of the switching element can be reduced. In other words, it is known that the drain current of a MOSFET shows a positive temperature characteristic in a region where a gate voltage is low and a negative temperature characteristic in a region where the gate voltage is high, so that a temperature coefficient becomes small with the gate voltage in the vicinity of the boundary.

H level duration Ton in the output signal (Out) of the one-shot circuit 3 has a period To+Td where To is a H level period in the input signal (In) and Td is a H level delay period needed to charge the capacitor C31 of the one-shot circuit 3 until the threshold value Vth1 of the inverter. When threshold value at which current of MOS transistor PM 31 starts to flow is expressed as Vth2, current charging the capacitor C31 becomes almost (Vin−|Vth2|)/R31 (the resistance value of the resistor R31 also is expressed as R31) and increases with rise of the input voltage Vin.

On the other hand, because the threshold value Vth1 of the inverter does not depend upon the input voltage, the value of H level delay duration Td decreases with rise of the input voltage Vin. Because the H level delay duration Td is inversely proportional to the current that charges the capacitor C31, H level duration Ton is approximately expressed as Ton=To+K/(Vin−|Vth2|) (K is constant). It is desirable that To and K are determined so that Ton expressed by the expression gets closer to a desired inverse proportion curve within the use scope of the input voltage Vin. For example, in order to satisfy a request that H level duration Ton becomes respectively 250 ns or 150 ns at 3V or 5V in the input voltage Vin in |Vth2|=1V, it is only necessary that To=50 ns and K=400 ns·V.

In addition, in the embodiment, a change of the output voltage Vout corresponds to changing the capacitance value of the capacitor C31 corresponding to a division ratio of the resistor R1 dividing the output voltage Vout. This method is suitable for the case where the resistor R1 is integrated into an integrated circuit and setting of the division ratio of the output voltage Vout is changed by logic.

Figures 6A, 6B:
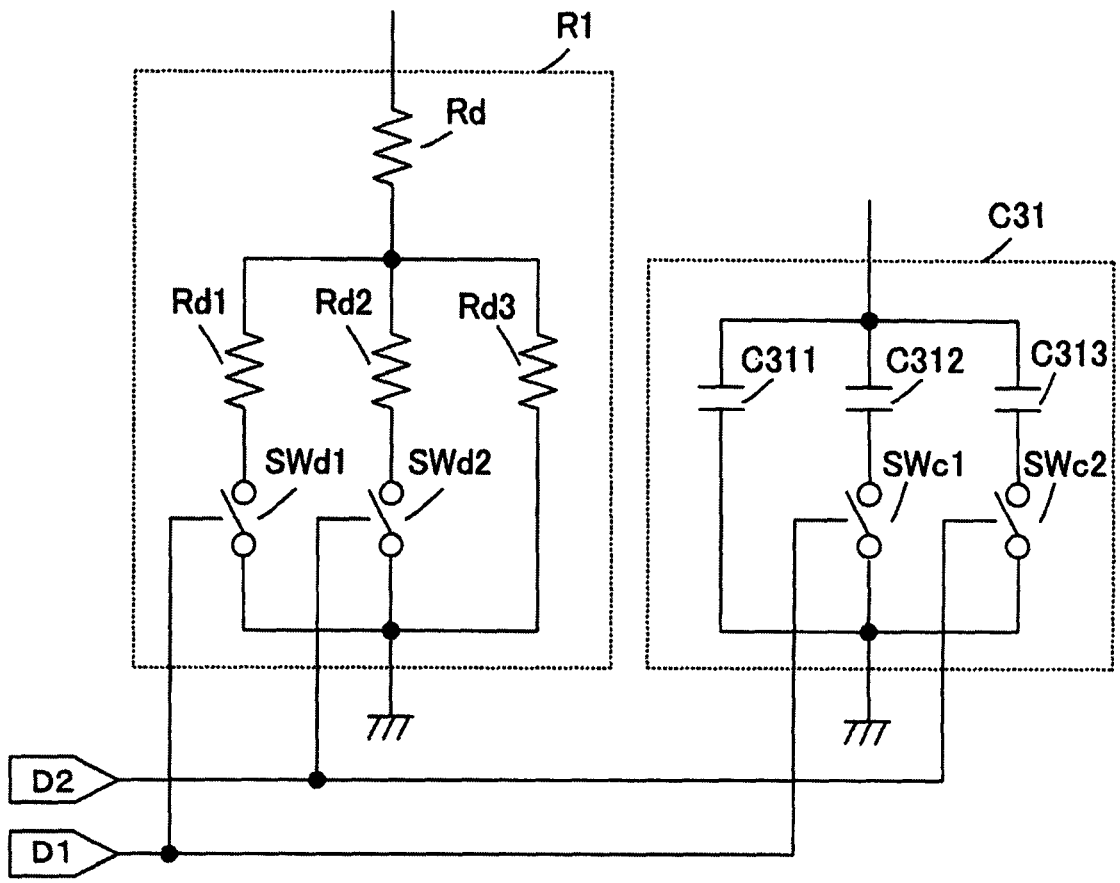
FIGS. 6A and 6B shows an example of logic configuration to change capacitance value of a capacitor corresponding to a division ratio of a resistor.

FIGS. 6A and 6B is a view showing an example of logic configuration to change the capacitance value of the capacitor C31 corresponding to the division ratio of the resistor R1. The resistor R1 includes a resistor Rd and a parallel circuit of resistors Rd1 through Rd3, and the resistor Rd and the parallel circuit of resistors Rd1 through Rd3 are connected in series. Electric switches SWd1 and Swd2 are connected in series to resistors Rd1 and Rd2 respectively. In addition, the capacitor C31 includes a parallel circuit of capacitors C311 through C313, and electric switches SWc1 and SWc2 are connected in series to capacitors C312 and C313 respectively.

The electric switches SWd1 and SWc1 are turned on and off by a signal (D1), and the electric switches SWd2 and SWc2 are turned on and off by a signal (D2). Thereby the division ratio of the resistor R1 is determined and capacitance value of the capacitor C31 is determined. A relationship of "0" or "1" value of signals (D1) and (D2), the division ratio of the resistor R1 and a capacitance ratio of the capacitor C31 is shown in a list of FIGS. 6A and 6B. As described above, setting of the division ratio of the output voltage Vout can be changed by changing a division ratio with logic in the integrated circuit. The divided voltage of the output voltage Vout is output at the connecting point of the resistor Rd and the parallel circuit of resistors Rd1 through Rd3.

In this manner, in the preferred embodiment, because the ON time of the switching element is linked to at least one of the input voltage change and the output voltage change by the control circuit performing the PFM control, reduction of current consumption can be obtained by means of a simple configuration and regardless of a change of the input voltage and the output voltage the switching frequency decreases in the light load case, in which the difference between the output voltage Vout and the target voltage is large, and further it is possible to operate at an approximately constant switching frequency in the heavy load case.

Figure 7:
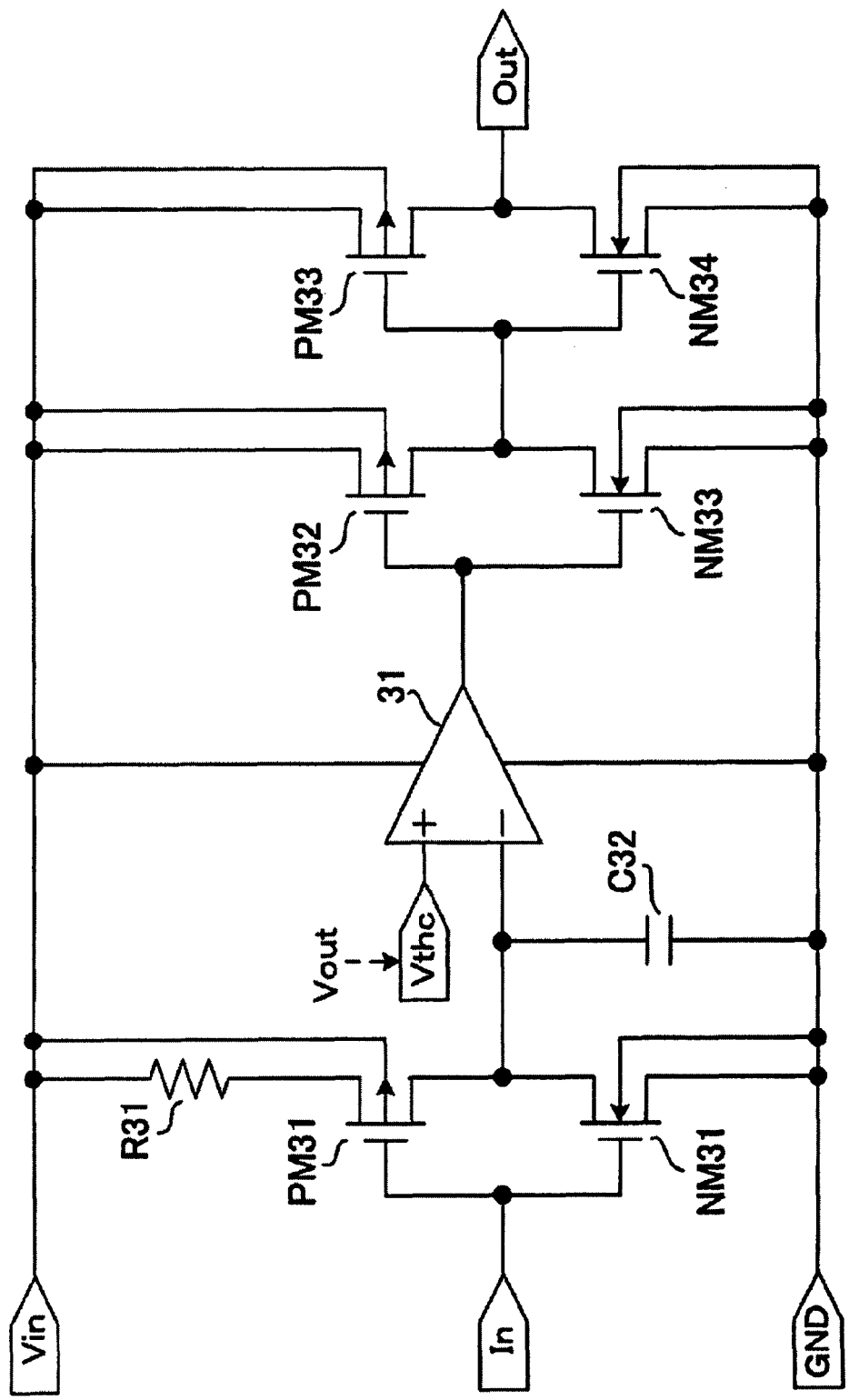
FIG. 7 is a circuit diagram showing another example of the configuration of the one-shot circuit according to the preferred embodiment.

FIG. 7 is a circuit diagram showing another example of the configuration of the one-shot circuit 3 according to the embodiment. The one-shot circuit 3 uses a comparator 31 using an operational amplifier instead of the current source 131 and the MOS transistor NM32 of FIG. 5. The ON time of switching corresponds to variation of the output voltage Vout by changing comparing-voltage value Vthc inputting into a non-inverting input terminal of the comparator 31 corresponding to the output voltage Vout. A capacitor C32 is connected to an inverting input terminal of the comparator 31, and otherwise the configuration is the same as the circuit diagram of FIG. 5.

In addition, according to the embodiment of the present invention, the DC-DC converter for fixed ON time PFM control is realized by a simple control circuit of low current consumption and the ON time is decided depending on information of the input and the output voltages. Thereby, variety of the switching frequency, caused by variation of the input voltage and output voltage, is suppressed. Further, the DC-DC converter according to the preferred embodiment can be applied to step-up converters and inversion converters without being limited to step-down converters. In addition, the DC-DC converter according to the preferred embodiment can be also applied to DC-DC converters of a synchronizing rectifier type using a MOS transistor instead of the diode·D1.

It will of course be appreciated that the invention may be practiced otherwise than as specifically disclosed herein without departing from the scope of the invention.

What is claimed is:

1. A DC-DC converter controlling direct current power comprising:
    a switching element switching on and off an input direct current;
    a control circuit periodically switching said switching element on for an ON time and off for an OFF time; and
    a resistor dividing an output voltage of the DC-DC converter by a variable division ratio, the divided output voltage being fed back to the control circuit, wherein
    the ON time is determined by a pulse width of a one-shot circuit, and
    under both light and heavy load conditions, said control circuit applies a pulse frequency modulation (PFM) and controls the ON time, wherein
    the PFM is applied by varying said OFF time in accordance with a pulse frequency modulation control, and
    the ON time is controlled to increase when said pulse width is increased in accordance with one of a rise in the output voltage or a drop in the variable division ratio of the output voltage of said DC-DC converter.

2. The DC-DC converter according to claim 1, wherein the control circuit includes
    an error amplifier which amplifies a difference between the divided output voltage and the target voltage and outputs an error signal,
    an oscillator generating a frequency that increases and decreases according to a value of the error signal, and
    the one-shot circuit which generates the ON time based on a trigger by a signal being output by the oscillator.

3. The DC-DC converter according to claim 2, wherein the one-shot circuit comprises:
    a capacitor,
    a current-supply circuit to supply a charging current to the capacitor, and a voltage decision circuit to determine whether a voltage of the capacitor is more than a decision voltage.

4. The DC-DC converter according to claim 3, wherein the current-supply circuit supplies the charging current depending on the input voltage.

5. The DC-DC converter according to claim 3, wherein the capacitor has a capacitance value that varies according to the output voltage or the target voltage.

6. The DC-DC converter according to claim 3, wherein the voltage decision circuit uses a decision voltage corresponding to the output voltage or the target voltage.

* * * * *